United States Patent [19]

Steffes

[11] Patent Number: 4,530,209
[45] Date of Patent: Jul. 23, 1985

[54] CONTROL ARRANGEMENT FOR A VEHICULAR BRAKE SYSTEM WITH HYDRAULIC BRAKE BOOSTER

[75] Inventor: Helmut Steffes, Eschborn, Fed. Rep. of Germany

[73] Assignee: ITT Industries, Inc., New York, N.Y.

[21] Appl. No.: 609,532

[22] Filed: May 14, 1984

Related U.S. Application Data

[63] Continuation of Ser. No. 295,038, Aug. 21, 1981, abandoned.

[30] Foreign Application Priority Data

Oct. 3, 1980 [DE] Fed. Rep. of Germany ....... 3037460

[51] Int. Cl.$^3$ .............................................. B60T 13/00
[52] U.S. Cl. .................................... 60/547.1; 60/563; 60/591
[58] Field of Search .................. 60/547.1, 548, 560, 60/562, 563, 574, 582, 588, 591

[56] References Cited

U.S. PATENT DOCUMENTS

| 3,513,656 | 5/1970 | Engle | 60/574 |
| 3,727,986 | 4/1973 | Koivunen | 60/548 |
| 4,126,996 | 11/1978 | Leiber | 60/547.1 |
| 4,404,803 | 9/1983 | Steffes | 60/565 |

FOREIGN PATENT DOCUMENTS 2443545  3/1976  Fed. Rep. of Germany .

OTHER PUBLICATIONS

Stewart, H. L. et al., *ABC's of Hydraulic Circuits*, Bobbs-Merrill Co., 1973, pp. 83–84.

Primary Examiner—Abraham Hershkovitz
Attorney, Agent, or Firm—James B. Raden

[57] ABSTRACT

An arrangement for controlling the admission of a hydraulic fluid to respective wheel brake actuating cylinders either from an auxiliary pressure source or from a master cylinder includes a pressure limiting valve and a hydraulically operatable switching valve including a valve body movable only when the auxiliary pressure source is fully operational from a first position in which it connects the master cylinder with the actuating cylinders to a second position in which it connects the auxiliary pressure source with the actuating cylinders and the master cylinder with the pressure limiting valve. The limiting pressure of the pressure limiting valve is adjusted in dependence on the brake pedal travel. The respective master cylinder piston carries a deflectable seal which permits fluid to flow past it in one direction but not in the opposite direction. The pressure at which the switching valve member moves into its second position has a predetermined level, preferably 1 to 2 bar gauge. Check valves which open toward the actuating cylinders when the pressure acting on the switching valve member exceeds the switching pressure by a predetermined amount are interposed in bypass conduits circumventing the switching valve.

9 Claims, 1 Drawing Figure

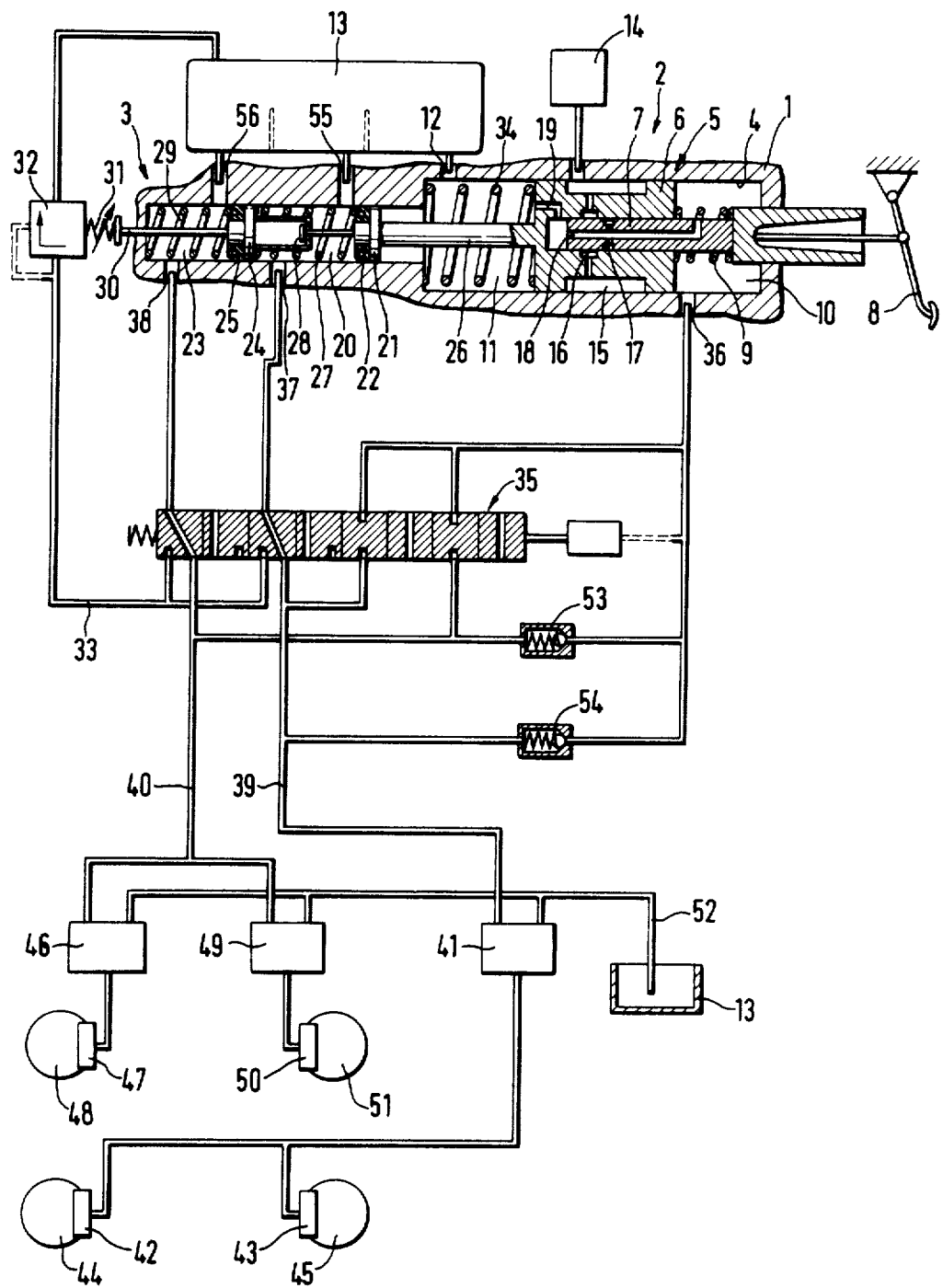

CONTROL ARRANGEMENT FOR A VEHICULAR BRAKE SYSTEM WITH HYDRAULIC BRAKE BOOSTER

This application is a continuation of application Ser. No. 295,038, filed Aug. 21, 1981, now abandoned.

BACKGROUND OF THE INVENTION

The present invention relates to a vehicular hydraulic braking system with a hydraulic brake booster, in general, and more particularly to a system including antiskid equipment.

There are already known hydraulic braking systems in which the pressure of the brake fluid from an auxiliary pressure source is supplied to the wheel brake actuating cylinders by means of a control valve operated in dependence on a brake pedal travel and loaded by a travel simulator when the auxiliary pressure source is intact and in which the brake fluid pressure is furnished by a master cylinder, in particular by a tandem master cylinder, which is also operated in dependence on the brake pedal travel, in the event of failure of the auxiliary pressure source.

In one known vehicular braking system of this type which is known from the German published patent application DE-OS No. 24 43 545, a control valve is provided having an outer and an inner slide which are movable relative to each other. The inner slide is connected with the brake pedal. One side of the outer slide is acted upon by the outlet pressure of the control valve, while the other side of the outer slide is acted upon by a stack of Belleville spring washers serving as a travel simulator. As long as the auxiliary pressure source, which may include a pressure accumulator or a compressing pump, is operational, the pressure prevailing at the outlet of the control valve is supplied to the wheel brake operating cylinders via the working chambers of a tandem master cylinder and via antiskid control valves. The brake fluid enters the working chambers from reservoir chambers by flowing past deflectable seals of the respective master cylinder pistons opposite to their closing direction. If there is a failure of the auxiliary pressure source, the tandem master cylinder will be able to operate in the usual manner as the master cylinder pistons will be entrained for joint movement with the brake pedal after a short idle travel, so that their seals will move beyond respective feed ports. A disadvantage in this arrangement is that it is impossible to recognize defects at the seals as long as the auxiliary pressure source generates pressure. This, of course, may have grave consequences once the auxiliary pressure source fails.

SUMMARY OF THE INVENTION

Accordingly, it is a general object of the present invention to avoid the disadvantages of the prior art.

More particularly, it is an object of the invention to develop an arrangement for controlling the admission of a pressurized hydraulic fluid from an auxiliary pressure source and/or from a master cylinder to the valve brake actuating cylinders, which is not possessed of the disadvantages of the conventional arrangements of this type.

Still another object of the invention is to so construct the arrangement of the type here under consideration as to be able to detect defects in operation of the master cylinder even when the auxiliary pressure source is fully operational.

A concomitant object of the pressure invention is to so design the control arrangement as to be simple in construction, inexpensive to manufacture, and relaible in operation nevertheless.

In pursuance of these objects and others which will become apparent hereafter, one feature of the present invention resides, in an arrangement for controlling the admission of hydraulic fluid from a master cylinder and an auxiliary pressure source to respective wheel brake actuating cylinders of a vehicular braking system, particularly such including antiskid control equipment, in a combination comprising a pressure limiting valve; and means interposed in the braking system between the master cylinder and the auxiliary pressure source, on the one hand, and the actuating cylinders and the pressure limiting valve, on the other hand, for establishing communication therebetween, including at least one switching valve having a valve member movable between a first position in which it establishes communication between the master cylinder and the actuating cylinders and a second position in which it establishes communication between the auxiliary pressure source and the actuating cylinders and between the master cylinder and the pressure limiting valve, and means for moving the switching valve member from the first into the second position only if the auxiliary pressure source is operational. Advantageously, the controlling arrangement further comprises means for adjusting the limiting pressure of the pressure limiting valve in dependence on the brake pedal travel.

When the control arrangement is constructed in this manner, there is obtained the advantage that the working chamber of the master cylinder has an additional accumulating function during normal operation. Together with the pressure limiting valve, it will form a hydraulically operating travel simulator. As compared with a spring system, this travel simulator is advantageous in that the huge forces required for the control valve may be generated without any difficulties, that no aging has to be feared, and the control dependence can easily be varied by changing the characteristic line. However, such simulator pressure may only be accumulated in the working chamber of the master cylinder if the seals are in good repair and will thus also be leakproof in an emergency. Any defect in the functioning of the master cylinder may be recognized by the driver even during normal operation in that the pedal yields easily because of the lacking counteraction of the simulator force.

It would be possible for the switching valve to be, for example, directly controlled by the full pressure of the auxiliary pressure source so as to assume its working position. However, it will be much more advantageous for the switching valve to be controllable by the pressure at the outlet port of the control valve of the brake booster so as to move to its working position if said pressure exceeds a predetermined switching pressure. As a result of this, the wheel brake actuating cylinders will communicate with the working chamber of the master cylinder at the onset of any braking operation. All spaces in the actuating cylinders resulting from idle travel will thus be filled by brake fluid from the master cylinder and, depending on the selected valve of the switching pressure of the switching valve, the master cylinder will build up a certain braking pressure. Accordingly, the loading of the auxiliary pressure source will be slight, in that the auxiliary pressure source will then only serve for building up of the actual pressure or supply of the remaining pressure difference and, if an antiskid control device is provided, for the replenishment of the brake fluid returned by the antiskid control valves to the fluid reservoir. A further advantage is to be seen in that the seal of the master cylinder piston will positively have moved beyond the feed port at the moment of switching so that the master cylinder working chamber performs its accumulating function immediately after the switching of the switching valve. The switching pressure advantageously amounts to 1 to 2 bars gauge.

If the master cylinder is constructed as a tandem master cylinder, the switching valve is so designed as to separately connect the two outlet ports of the tandem master cylinder to the hydraulic circuits leading to different wheel brake actuating cylinders, and to jointly connect the outlet ports to the pressure limiting valve. Thus, the two working chambers of the tandem master cylinder will serve as accumulating chambers, the pressure in one of said accumulating chambers directly acting on the control valve and the pressure in the other accumulating chamber acting on the control valve via the usual compression spring.

Further, it is advantageous for the paths of the directional control valve arrangement, leading from the outlet port of the control valve to the wheel brake actuating cylinders, to be bridged by a check valve each of which will open towards the wheel brake actuating cylinders when the pressure acting thereon exceeds the switching pressure of the switching valve by a predetermined value. These check valves serve as safety valves for the event of operating failure of the switching valve for one reason or another.

BRIEF DESCRIPTION OF THE DRAWING

Above-mentioned and other features and objects of this invention will become more apparent by reference to the following description taken in conjunction with the accompanying drawing, in which:

The sole FIGURE of the drawing is a diagramatic partly sectioned representation of a vehicular brake system incorporating a control arrangement according to the present invention.

DETAILED DESCRIPTION OF THE PREFERRED EMBODIMENT

Referring now to the drawing in detail, it may be seen that a brake booster 2 and a tandem master cylinder 3 are arranged in a housing 1. The moving parts are accommodated in a housing bore 4.

The brake booster 2 has a control valve 5 having an outer piston 6 and an inner slide 7. The slide 7 is coupled with a brake pedal 8, and a spring 9 urges the slide 7 to the right relative to the piston 6, as considered in the position shown in the drawing. The piston 6 separates an outlet chamber 10 from a relief chamber 11 which communicates with a fluid reservoir 13 via a feed port 12. An auxiliary pressure source 14 communicates with an annular chamber 15 and an annular groove 16 in the piston 6. Upon movement of the slide 7 to the left in relation to the piston 6, communication will be established between the annular groove 16 and the outlet chamber 10 via the annular groove 17 and an axial channel 18 of the slide 7 simultaneously with closing of an outlet opening 19. In the rest position, the outlet chamber 10 communicates with the reservoir 13 via the outlet opening 19.

The tandem master cylinder 3 has a first working chamber 20 receiving a piston 21 and a seal 22, as well as a second working chamber 23 accommodating a piston 24 and a seal 25. The piston 21 is connected with the piston 6 of the hydraulic booster 2 via a piston rod 26. The pistons 21 and 24 are connected with each other via a spring 27 and a lost motion coupling 28. The piston 24 is acted upon by a return spring 29 and acts on a closing spring 31 of a pressure limiting valve 32 by means of a rod 30. The pressure limiting valve 32 is interposed in a relief conduit 33 leading to the fluid reservoir 13.

As a consequence thereof, the closing spring 31 will be compressed in dependence on the travel of the brake pedal 8, thus adjusting the limiting pressure in dependence on the pedal travel. A further consequence is that the piston 6 of the control valve 5 will usually be biased from the right-hand side by the pressure in the outlet chamber 10 and by the force of the spring 9 and from the left-hand side by the force of a return spring 34 and the pressure in the first working chamber 20 as well as by the force of the spring 27 which, in turn, depends on the pressure in the second working chamber 23, so that the piston 6 assumes respective positions of equilibrium corresponding to the then existing balance of forces.

A switching valve 35 will be switched from the illustrated rest position into its working position in dependence on the pressure at an outlet port 36 of the control valve 5. In the rest position, two outlet ports 37 and 38 of the tandem master cylinder 3 communicate with two conduits 39 and 40, respectively. The conduit 39 leads via an antiskid control valve 41 to wheel brake actuating cylinders 42 and 43 of respective rear wheels 44 and 45. The conduit 40 leads via an antiskid control valve 46 to a wheel cylinder 47 of a left front wheel 48 and via an antiskid control valve 49 to a wheel cylinder 50 of a right front wheel 51. A common relief conduit 52 leads to the fluid reservoir 13. In the working position, the outlet port 36 of the control valve 5 will communicate with the two conduits 39 and 40. At the same time, the outlet ports 37 and 38 of the tandem master cylinder 3 are connected to one relief conduit 33 leading to the pressure control valve 32. Additionally, the conduits 39 and 40 are connected with the outlet port 36 via respective check valves 53 and 54, which will open if a predetermined pressure is exceeded.

In normal operation, i.e. with the auxiliary pressure source 14 fully operational, this arrangement will work as follows: Upon depression of the pedal 8, the slide 7 will move to a position in which the annular grooves 16 and 17 overlap and the line 19 is closed. Thus, the pressure in the outlet chamber 10 will increase and the piston 6 will be moved to the left into a position in which the outlet chamber 10 communicates neither with the auxiliary pressure source 14 nor with the fluid reservoir 13. During this movement, the piston 21 is carried along by means of the rod 26 until its seal 22 moves beyond a feed bore 55. Due to the action of the spring 27, the piston 24 is also carried along until its seal 25 moves beyond a feed port 56. Thereafter, brake fluid will be supplied from the two working chambers 20 and 23 into the wheel brake actuating cylinders 42, 43, 47, and 50. As soon as the pressure in the outlet chamber 10 exceeds a switching pressure of 1 to 2 bars gauge, the switching valve 35 will move to its working position. Now the dynamic pressure of the outlet chamber 10 will become effective in the wheel brake actuating cylinders while the pressure in the working chambers 20 and 23 of the tandem master cylinders 3 is limited to a given level by means of the pressure control valve 32. This limiting pressure depends on the extent of travel of the brake pedal 8 inasmuch as the piston 6 follows the pedal 8 and as its movement is transmitted via the pistons 21 and 24 to the actuating spring 31 of the pressure control valve 32. The accumulated pressure in the working chambers 20 and 23 will act on the piston 6 from the left-hand side. An equilibrium state will be achieved based on the surface ratios and the forces of the various springs. In this equalibrium state, the pressure in the inlet chamber 10 has a defined value in relation to the accumulated pressure in the working chambers 20 and 23 and hence in dependence on the position of the pedal 8. Moreover, since the pressure in the inlet chamber 10 also acts on the left-hand side of the slide 7, the driver will note a resistance at the pedal 8 which will become more pronounced as the extent of pedal travel increases. Upon return of the pedal 8 the pressure fluid at first flows back into the fluid reservoir 13 via the outlet chamber 10 and the conduit 19. As soon as the switching valve 35 returns into its rest position, the tandem master cylinder 3 will receive the returning brake fluid.

If there is a failure of the auxiliary pressure source 14, the slide 7 will contact the bottom of the blind bore of the piston 6 after a short travel of the brake pedal 8, after which the piston 6 will be moved to the left, together with the pistons 21 and 24. As soon as the seals 22 and 25 have moved beyond the feed ports 55 and 56, the wheel brake actuating cylinders 42, 43, 47, 50 will receive the brake fluid exclusively from the working chambers 22 and 23.

If the seal 22 and/or the seal 25 loses its sealing effect, it will be impossible to build up a pressure in the associated working chamber 20 and/or working chamber 23 even during normal operation. Consequently, the brake pedal 8 can be depressed to the left by an appropriate amount, the piston 6 being displaced simultaneously therewith. Thus, the reduced resistance and, consequently, the existence of the defect will be clearly perceived by the vehicle operator.

This arrangement may also cooperate with a single-piston master cylinder. The switching valve 35 which, in the illustrated embodiment, includes an integral valve slide, may also consist of several individual valves operated by a common control signal.

While I have described above the principles of my invention in connection with specific apparatus, it is to be clearly understood that this description is made only by way of example and not as a limitation to the scope of my invention as set forth in the accompanying claims.

I claim:

1. In a vehicular braking system employing hydraulic brake booster action, apparatus for controlling the admission of hydraulic fluid from a combined structure including a brake booster and master cylinder to respective wheel brake actuating cylinders of the system, and for controlling the admission of fluid from an auxiliary pressure source to said wheel cylinders, said system comprising a reservoir for maintaining hydraulic fluid at ambient pressure and an auxiliary pressure source of fluid at pressures above the ambient pressure, at least one switching valve in the path of fluid from said combined structure to said wheel cylinders, said switching valve operable between a first position in which there is communication between the master cylinder and the wheel cylinders for fluid from said reservoir and from the booster for fluid from said auxiliary source to said wheel cylinders and a second position in which there is return communication from said master cylinder to said reservoir and communication from said brake booster to said wheel cylinders for fluid from said auxiliary source, said switching valve responsive to pressure of fluid from said auxiliary source exceeding a predetermined level above the ambient pressure level for operating from said first position to said second position, and a pressure limiting valve in a line of communication from said master cylinder to said reservoir with the switching valve in its second position, said limiting valve being dependent on the operation of a brake pedal for limiting the pressure of fluid in said master cylinder with said switching valve in the second position.

2. The apparatus as defined in claim 1, and further comprising means for adjusting the limiting pressure of said pressure limiting valve in dependence on the amount of brake pedal travel.

3. The apparatus as defined in claim 1, further comprising a brake booster within said master cylinder structure including a pressure control valve interposed between the auxiliary pressure source and said switching valve; and wherein said switching valve includes a hydraulically operatable unit acted upon by the pressure prevailing at the outlet of said pressure control valve.

4. The apparatus as defined in claim 3, further comprising means for holding said switching valve in said first position until the pressure acting on said valve exceeds a predetermined switching pressure.

5. The apparatus as defined in claim 4, wherein said switching pressure is in the range substantially between 1 and 2 bar gauge.

6. The apparatus as defined in claim 3, further comprising means for bypassing said switching valve when the pressure at said outlet reaches a further predetermined level.

7. The apparatus as defined in claim 6, wherein said bypassing means includes at least one bypass conduit and a check valve therein.

8. The apparatus as defined in claim 6, further comprising means for holding said switching valve in said first position until the pressure acting on said valve exceeds a predetermined switching pressure; and wherein said further level is higher by a predetermined amount than that of said switching pressure.

9. The apparatus as defined in claim 1, wherein the braking system includes at least two separate hydraulic braking circuits each connecting said switching valve with different ones of the wheel cylinders; wherein the master cylinder is a tandem master cylinder having two outlet ports individually connected to said switching valve; and wherein said switching valve individually connects the outlet ports to the separate braking circuits in said first position and jointly connects the outlet ports to said pressure limiting valve in said second position.

* * * * *